(12) United States Patent
Lee

(10) Patent No.: US 10,871,251 B2
(45) Date of Patent: Dec. 22, 2020

(54) WATERPROOF QUICK COUPLER

(71) Applicant: Samsung Electronics Co., Ltd., Suwon-si (KR)

(72) Inventor: Yong-ik Lee, Gwangju (KR)

(73) Assignee: Samsung Electronics Co., Ltd., Suwon-si (KR)

(*) Notice: Subject to any disclaimer, the term of this patent is extended or adjusted under 35 U.S.C. 154(b) by 296 days.

(21) Appl. No.: 15/766,358

(22) PCT Filed: Sep. 29, 2016

(86) PCT No.: PCT/KR2016/010890
§ 371 (c)(1),
(2) Date: Apr. 5, 2018

(87) PCT Pub. No.: WO2017/078276
PCT Pub. Date: May 11, 2017

(65) Prior Publication Data
US 2018/0306364 A1 Oct. 25, 2018

(30) Foreign Application Priority Data
Nov. 5, 2015 (KR) .................. 10-2015-0154974

(51) Int. Cl.
*F16L 37/28* (2006.01)
*G01M 3/02* (2006.01)
(Continued)

(52) U.S. Cl.
CPC ........... *F16L 37/28* (2013.01); *F16L 37/0844* (2013.01); *F16L 55/115* (2013.01);
(Continued)

(58) Field of Classification Search
CPC ... Y10S 285/902; F16L 37/0844; F16L 37/10; F16L 37/12; F16L 37/138; F16L 37/24; F16L 37/107; F16L 37/248
(Continued)

(56) References Cited

U.S. PATENT DOCUMENTS 2,245,847 A   6/1941 Bagby
2,819,733 A * 1/1958 Maisch ............... F16L 37/0844
                                                    285/317
(Continued)

FOREIGN PATENT DOCUMENTS

CN   2260942 Y   8/1997
DE    404891 C  10/1924
(Continued)

OTHER PUBLICATIONS

Supplementary European Search Report dated Sep. 24, 2018 in connection with European Patent Application No. 16 86 2294, 5 pages.
(Continued)

*Primary Examiner* — Aaron M Dunwoody

(57) ABSTRACT

A waterproof quick coupler which closes a port of a pressure vessel in an air-tight state during a water leakage inspection of a welding portion of the pressure vessel of a compressor. The quick coupler comprises: an outer body having an opening formed at a distal end portion thereof, an inner body flexibly disposed to be rotatable and linearly movable in the outer body; a cap coupled to the distal end portion of the outer body, and a fixing lever flexibly disposed between the inner body and the cap to clamp and unclamp a port of a pressure vessel when the inner body moves forward and backward, wherein the inner body may be locked in the
(Continued)

outer body when moving backward, and may be unlocked from the outer body when the outer body rotates in one direction.

15 Claims, 11 Drawing Sheets

(51) Int. Cl.
  *F16L 55/115* (2006.01)
  *F16L 37/084* (2006.01)
  *F16L 37/113* (2006.01)
  *F16L 37/092* (2006.01)

(52) U.S. Cl.
  CPC ....... *F16L 55/1155* (2013.01); *F16L 55/1157* (2013.01); *G01M 3/02* (2013.01); *F16L 37/0845* (2013.01); *F16L 37/092* (2013.01); *F16L 37/113* (2013.01)

(58) Field of Classification Search
  USPC ................... 285/316, 317, 307, 902
  See application file for complete search history.

(56) References Cited

U.S. PATENT DOCUMENTS

| | | | | |
|---|---|---|---|---|
| 3,100,655 | A * | 8/1963 | Work | F16L 37/127 285/33 |
| 3,167,335 | A * | 1/1965 | Maisch | F16L 37/0844 285/317 |
| 3,884,508 | A * | 5/1975 | Jones | F16L 37/0844 285/31 |
| 4,163,573 | A * | 8/1979 | Yano | F16L 37/0887 285/148.13 |
| 4,254,801 | A | 3/1981 | Gerthoffer et al. | |
| 4,261,601 | A * | 4/1981 | Sloan | F16L 29/007 285/308 |
| 4,759,572 | A | 7/1988 | Richardson | |
| 5,224,681 | A * | 7/1993 | Lundstrom | F16B 2/246 24/522 |
| 5,439,258 | A * | 8/1995 | Yates | F16L 37/12 285/313 |
| 5,799,985 | A * | 9/1998 | Murphy | F16L 37/05 285/101 |
| 6,056,328 | A | 5/2000 | Kubota | |
| 8,746,749 | B2 * | 6/2014 | Hama | F16L 17/035 285/307 |
| 2005/0127669 | A1 * | 6/2005 | Madden | F16L 37/248 285/360 |
| 2007/0274772 | A1 * | 11/2007 | Tiberghien | F16L 37/107 403/300 |
| 2009/0021007 | A1 * | 1/2009 | Le Bars | F16L 37/23 285/317 |
| 2012/0169041 | A1 | 7/2012 | King et al. | |
| 2015/0276109 | A1 * | 10/2015 | Minger | F16L 37/23 285/83 |
| 2019/0032832 | A1 * | 1/2019 | Tiberghien | F16L 37/107 |

FOREIGN PATENT DOCUMENTS

| | | |
|---|---|---|
| GB | 2203809 A | 10/1988 |
| JP | S4860122 U | 7/1973 |
| JP | S5023717 U | 3/1975 |
| JP | S63-275885 A | 11/1988 |
| JP | H10299966 A | 11/1998 |
| JP | H1182847 A | 3/1999 |
| JP | 2012021591 A | 2/2012 |
| KR | 96-0006182 B1 | 5/1996 |
| KR | 1998-0010383 A | 4/1998 |
| KR | 10-2010-0049875 A | 5/2010 |
| KR | 20-0468486 Y1 | 8/2013 |
| KR | 10-2015-0030931 A | 3/2015 |

OTHER PUBLICATIONS

ISA/KR, International Search Report and Written Opinion, International Application No. PCT/KR2016/010890, dated Jan. 11, 2017, 8 pages.

National Intellectual Property Adminstration, PRC, "The First Office Action," Application No. CN201680064876.X, dated May 24, 2019, 17 pages.

* cited by examiner

WATERPROOF QUICK COUPLER

CROSS-REFERENCE TO RELATED APPLICATIONS AND CLAIM OF PRIORITY

This application is a 371 National Stage of International Application No. PCT/KR2016/010890, filed Sep. 29, 2016 which claims priority to Korean Patent Application No. 10-2015-0154974 filed Nov. 5, 2015, the disclosures of which are herein incorporated by reference in their entirety.

TECHNICAL FIELD

Apparatuses and methods consistent with the present disclosure relate to a quick coupler, and more particularly, to a waterproof quick coupler for allowing a port of a pressure container to be in a sealed state during water leak examination on a weld zone of a pressure container of a compressor.

BACKGROUND

In general, a quick coupler is coupled to a port (a metallic tube formed of copper) of a pressure container in a sealed state to perform water tank examination (which is examination for checking a water leak state of a weld zone of a pressure container while a compressor is put in a water tank charged with water and a predetermined pressure is maintained in the pressure container) during water leak examination on a weld zone (e.g., oxygen welding or $CO_2$ welding) formed on the pressure container of the compressor A conventional quick coupler is formed of a brass material to be prevented from rusting and to withstand only a pressure. In this regard, since a metallic material is entirely painted through an electro painting process (painting process) based on electrical connection, internal and external parts of the conventional quick coupler are entirely painted and, accordingly, an additional process of removing the quick coupler from the port and covering the port with a separate cap is performed prior to the electro painting process.

When an internal part of a compressor is at a high pressure (e.g., 15 kg/cm$^2$ or more), it is cumbersome to use a separate instrument when the conventional quick coupler is removed from the port.

SUMMARY

The present disclosure provides a waterproof quick coupler to be easily decoupled from a port even in a high pressure is maintained in a pressure container.

The present disclosure also provides a waterproof quick coupler that is moveable to an electro deposition procedure without being removed from a port of a pressure container without change after water tank examination because a sealed state is maintained while the waterproof quick coupler is coupled to the port.

According to an aspect of the present disclosure, a quick coupler includes an external body having an opening at a fore-end portion, an internal body elastically disposed to be rotated and moved in a straight line in the external body, a cap coupled to a fore-end portion of the external body, and a fixing lever elastically disposed between the internal body and the cap and configure to clamp a port of a pressure container and to unclamp the port while the internal body is moved forward and backward, wherein the internal body is locked to the external body while being moved backward and is unlocked from the external body while the external body is rotated in one direction.

The internal body may be rotated by torsion force while being removed backward by the port and the external body is moved forward by pressurization force while being rotated in the same direction as a rotation direction of the internal body.

The external body may include at least one locking protrusion formed in the external body, the internal body may include a locking groove to which the locking protrusion is slidably coupled, and the locking groove may include a first section formed along a longitudinal direction of the internal body and a second section in a circumferential direction of the internal body from the first section.

The internal body may be locked to the external body while the locking protrusion is positioned in the second section of the locking groove, and the internal body may be unlocked from the external body while the locking protrusion is positioned in the first section of the locking groove.

The fixing lever may clamp the port while being moved backward and being rotated along with the internal body and may unclamp the port while the fixing lever is moved forward along with the external body.

The fixing lever may have one end portion that is rotatably coupled to the internal body and the other end portion that is elastically supported in the cap, and the one end portion of the fixing lever may be moved along with the internal body and the other end portion of the fixing lever is rotated based on the one end portion of the fixing lever.

The fixing lever may include a fixing hole into which the port is inserted, and the port may be clamped and may be unclamped to and from the fixing hole via rotation of the fixing lever in one direction and an opposite direction thereto.

The quick coupler may further include a first sealing unit coupled through a fore-end portion of the cap and configured to be elastically and close adhered to the port when the internal body is moved backward.

The first sealing unit may include, a first packing inserted into a through hole of the cap, and a first packing support member coupled to the first packing and fixed to the internal body, and the first packing may be pressed and coupled to the through hole of the cap while the internal body is moved backward.

An internal diameter of the through hole of the cap may be tapered inward from an outer side and the first packing has a shape corresponding to the through hole of the cap.

The first packing may have a cone shape and has a greater thickness than a thickness of the through hole of the cap.

The quick coupler may further include a second sealing unit fixed to the internal body and configured to be elastically adhered to an opening of the port.

The quick coupler may further include an elastic member shaped like a coil disposed between the second sealing unit and the external body.

The elastic member may have one end fixed to the second sealing unit or a rear end of the internal body and the other end fixed to the external body.

The quick coupler may further include a sealing member disposed between the second sealing member and the external body.

The external member may include a through hole at a rear end and the quick coupler may further include a chamber member detachably coupled to the external body through a connection member and having a chamber connected to an internal portion of the external body.

According to another aspect of the present disclosure, a quick coupler includes an external body, a cap coupled to a fore-end portion of the external body and configured to form a space portion along with the external body; an internal body that is slidably inserted into the external body, a fixing lever hinged to the internal body, a first sealing member coupled to the cap and closely adhered to a port of a pressure container inserted into the cap to maintain a sealed state, and a second sealing member disposed in the internal body and closely closed to an opening of a port of the pressure container to maintain a sealed state, wherein the fixing lever clamps the port while being rotated in one direction when the internal body is moved backward by the port and is rotated in an opposite direction and unclamps the port when the internal body is moved forward along with rotation of the external body.

DETAILED DESCRIPTION

Figure 1:
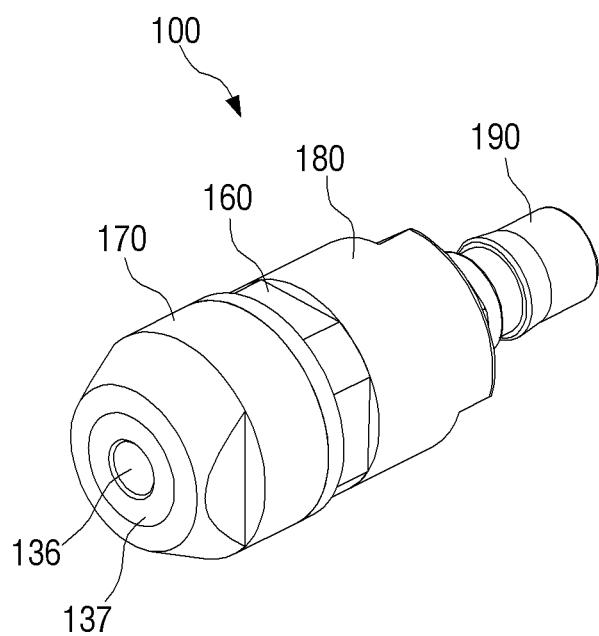
FIG. 1 is a perspective view of a waterproof quick coupler according to an exemplary embodiment.

Certain exemplary embodiments will now be described in greater detail with reference to the accompanying drawings. However, this is not intended to limit the present disclosure to particular modes of practice, and it is to be appreciated that all modifications, equivalents, and alternatives that do not depart from the spirit and technical scope of the present disclosure are encompassed in the present disclosure. In the drawings, and like reference numerals in the specification denote like elements.

The terms, such as "first", "second", and the like used in this disclosure may be used to refer to various elements regardless of the order and/or the priority and to distinguish the relevant elements from other elements, but do not limit the elements. For example, "a first user device" and "a second user device" indicate different user devices regardless of the order or priority. For example, without departing the scope of the present disclosure, a first element may be referred to as a second element, and similarly, a second element may be referred to as a first element.

Terms used in this disclosure are used to describe specified embodiments and are not intended to limit the scope of another embodiment. The terms of a singular form may include plural forms unless otherwise specified. All the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal unless expressly so defined in various embodiments of this disclosure. In some cases, even if terms are terms which are defined in this disclosure, they may not be interpreted to exclude embodiments of this disclosure.

A waterproof quick coupler according to an exemplary embodiment is coupled to a port "P" of a pressure container in a sealed state during a water leak water leak examination on a weld zone (e.g., oxygen welding or $CO_2$ welding) formed on the pressure container and water tank examination and electro paining are sequentially performed. Here, the port may be a refrigerant charging port or a refrigerant inlet/outlet port of the pressure container but is not limited thereto and, thus, the port may be applied to any device including a piped port included in a predetermined pressure container. Hereinafter, an example in which a waterproof quick coupler according to an exemplary embodiment is coupled to and removed from the port "P" of a pressure container is described.

Hereinafter, a structure of the waterproof quick coupler according to an exemplary embodiment is described in detail with reference to the drawings.

Figure 2:
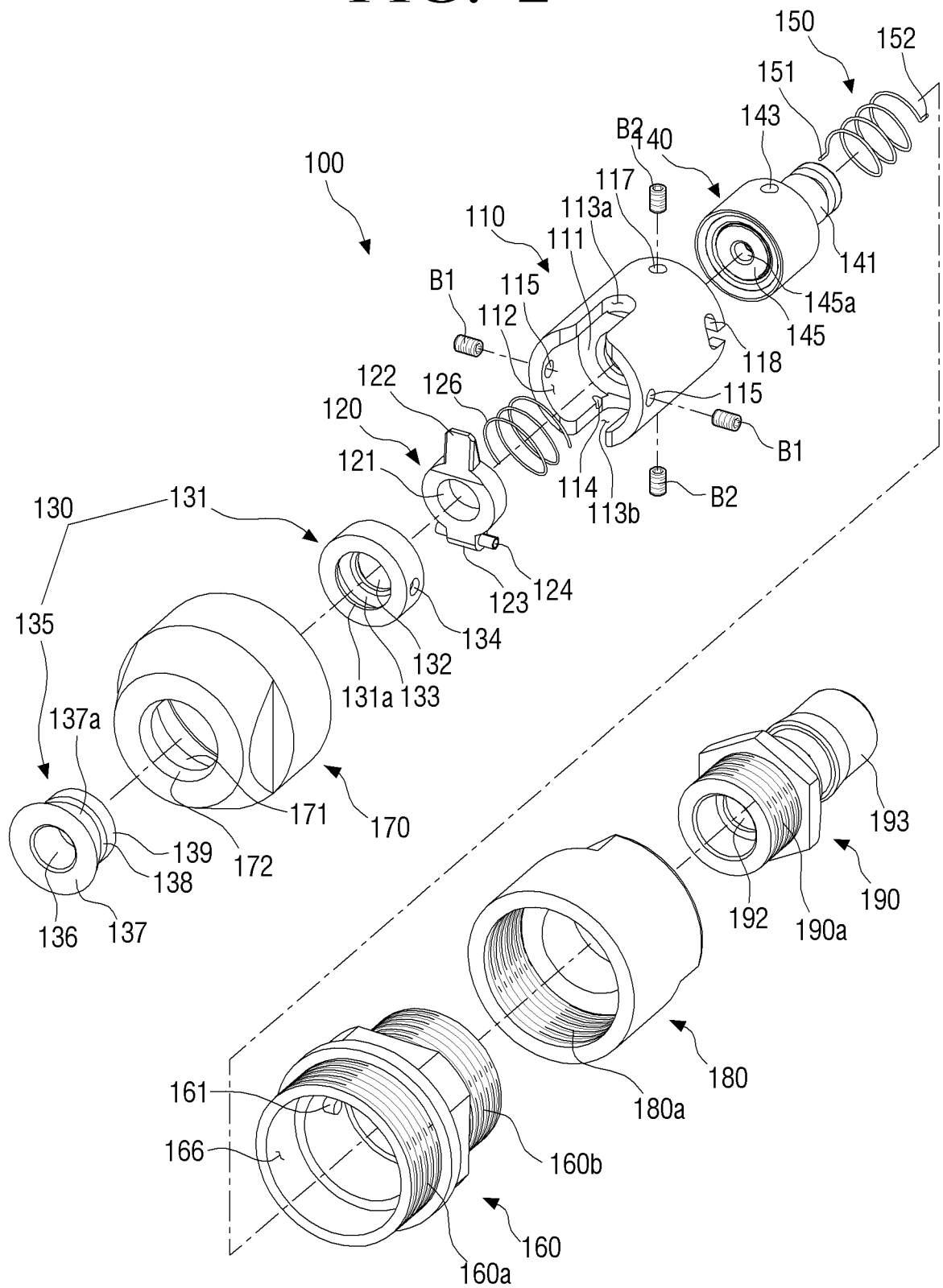
FIGS. 2 and 3 are exploded perspective views showing a waterproof quick coupler according to an exemplary embodiment.
Figure 3:
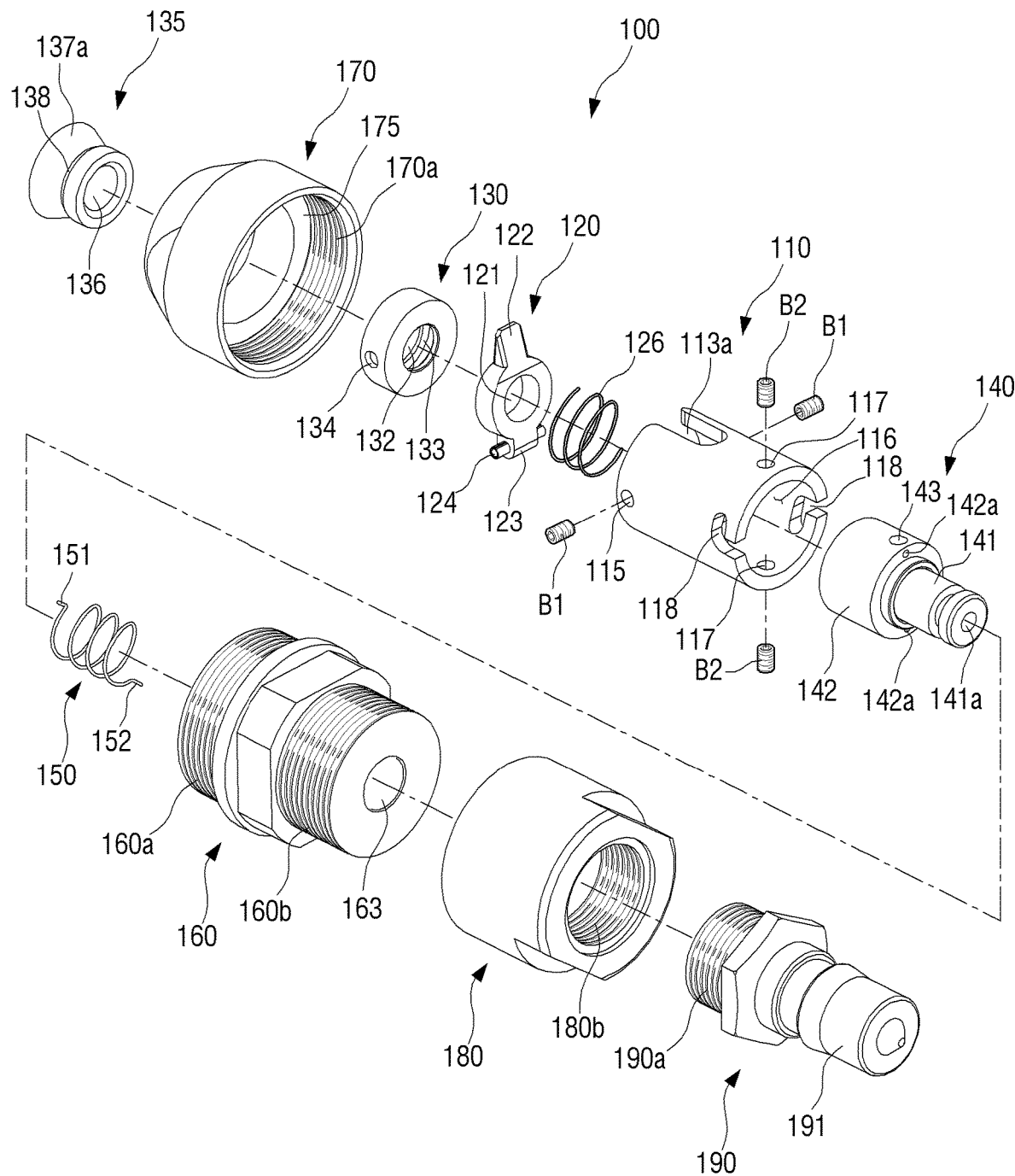

Referring to FIGS. 1 to 3, a waterproof quick coupler 100 according to an exemplary embodiment may be largely classified into internal components and external components. Here, the internal components may be mainly defined as components positioned inside the waterproof quick coupler 100 and the external components may be defined as components configuring an outer appearance of the waterproof quick coupler 100 while surrounding the internal components.

The internal components may include an internal body 110 for unlocking a port (e.g., a refrigerant charging port "P" (refer to FIG. 6) of a pressure container, a fixing lever 120 for locking the port "P" inserted into the waterproof quick coupler 100, a first sealing unit 130 that is elastically adhered to an outer circumferential surface of the port "P" inserted into the waterproof quick coupler 100 to maintain a sealed state, and a second sealing unit 140 that is closely adhered to an opening of the port "P" to maintain a sealed state.

The external components may include an external body 160 into which the internal body 110 is inserted, a cap 170 that is detachably coupled to a fore-end portion of the external body 160, a connection member 180 that is detachably coupled to a rear-end portion of the external body 160, and a chamber member 190 that is detachably coupled to the connection member 180.

When the waterproof quick coupler 100 according to the present embodiment is coupled to the port "P", the internal components and the external components may cooperatively maintain a sealed state of a material (air during an experiment) which is charged in a compressor through the opening of the port "P". When the waterproof quick coupler 100 according to the present embodiment is decoupled from the port "P", the port "P" may be unlocked through an operation of rotating the external components at a predetermined angle to easily decouple the waterproof quick coupler 100 from the port "P" without a separate instrument (tool).

As described above, when the waterproof quick coupler 100 according to the present embodiment is coupled to the port "P", a sealed state of the opening of the port "P" may be maintained and the waterproof quick coupler 100 may be easily removed from the port "P" even in a state in which a pressure in a compressor is maintained in a high pressure of 15 kg/cm or greater.

Hereinafter, the internal components and the external components are sequentially described with reference to the drawings.

Figure 6:
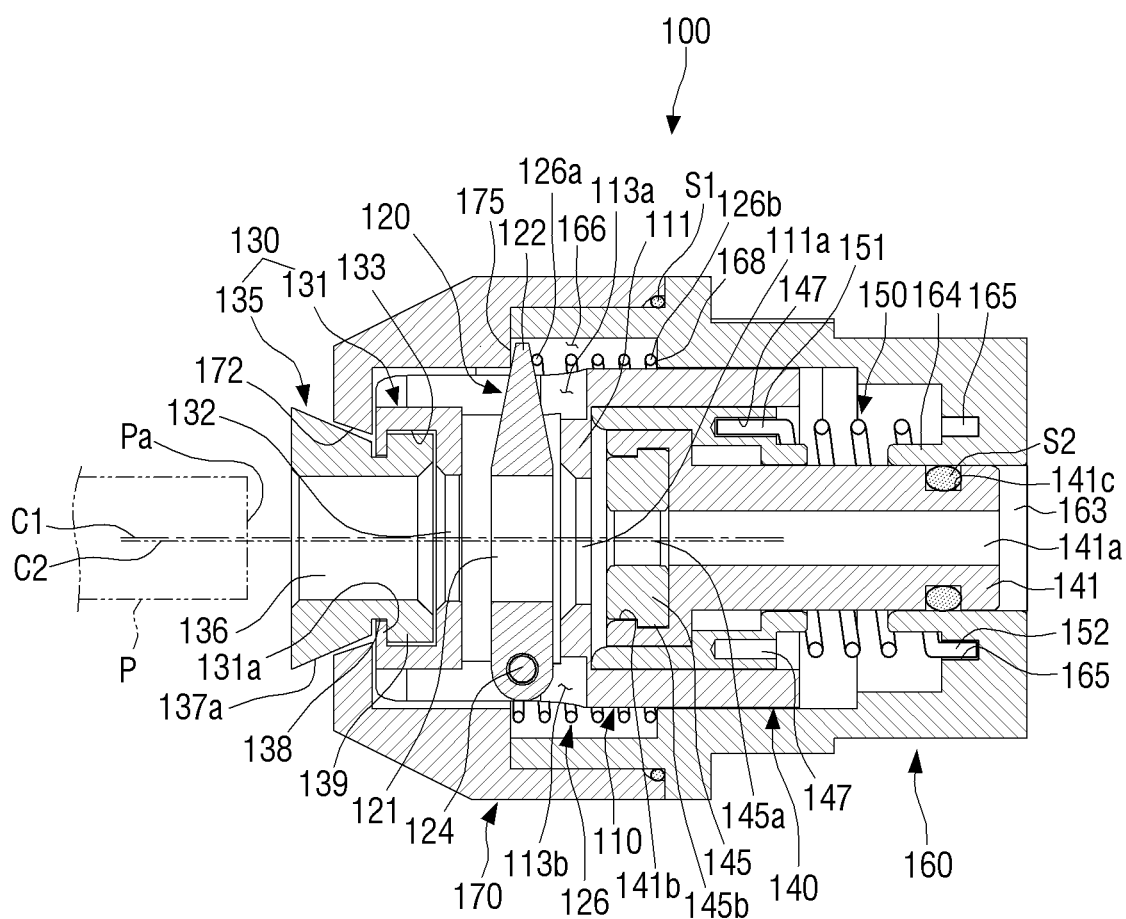
FIG. 6 is a cross-sectional view showing a state before a waterproof quick coupler is coupled to a port of a pressure container according to an exemplary embodiment.

As shown in FIG. 6, the internal body 110 may be elastically supported by a portion of the external body 160 through a second elastic member 150 to be described below. In this case, the second elastic member 150 may perform functions of both a compression spring and a torsion spring and, thus, when the waterproof quick coupler 100 according to the present embodiment is coupled to the port "P" of a pressure container, the port "P" may be moved backward while being rotated by elastic force (a function of a torsion spring) of the second elastic member 150 as being moved into the waterproof quick coupler 100. In the specification, a direction in which the internal body 110 is moved 'backward' may be defined as a direction in which the internal body 110 is moved away from the cap 170 and a direction which the internal body 110 is moved 'forward' may be defined as a direction in which the internal body 110 approaches the cap 170.

Figure 4:
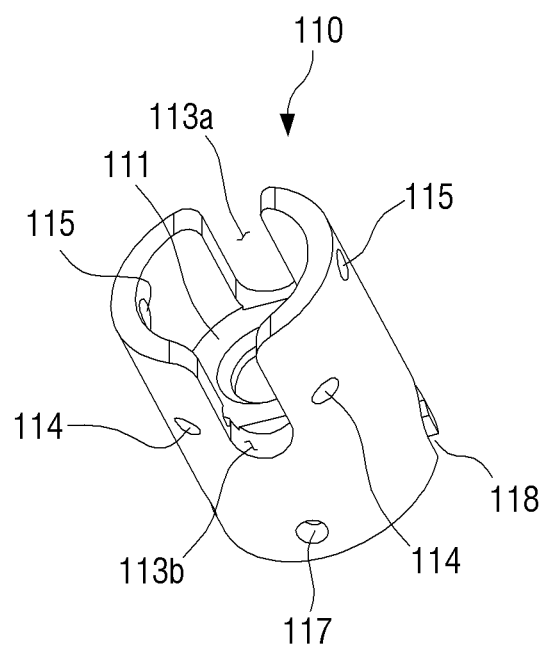
FIG. 4 is a perspective view of an internal body shown in FIG. 2.

As shown in FIG. 4, an intermediate wall 111 may be formed in an approximately perpendicular direction to a length direction of the internal body 10 in the internal body 110 and, an internal space of the internal body 110 may be divided into a first space 112 and a second space 116 by the intermediate wall 111. The intermediate wall 111 may include a through hole 111 a through which the first space 112 and the second space 116 are connected. Referring to FIG. 6, the fixing lever 120 and a first packing support member 131 of the first sealing unit 130 may be arranged in the first space 112. A portion of the second sealing unit 140 may be arranged in the second space 116.

The internal body 110 may include a first concave groove 113a and a second concave groove 113b that are formed at a fore-end portion to be symmetrical to each other. A protrusion 122 of the fixing lever 120 may be moved into the first concave groove 113a. A hinge part 123 of the fixing lever 120 may be moved into the second concave groove 113b. The first concave groove 113a and the second concave groove 113b may be formed in the form of a straight line to a point, which is approximately adjacent to the intermediate wall 111, from a fore end of the internal body 110. The first concave groove 113a may have any length as long as rotation of the fixing lever 120 at a predetermined angle based on a hinge axis 124 is not interfered.

As shown in FIG. 4, the internal body 110 may include a through hole 114 that is formed through the second concave groove 113b in an approximately perpendicular direction to the second concave groove 113b. A rotation axis 124 that is a rotation center of the fixing lever 120 may be inserted into the through hole 114.

To fix the first packing support member 131 moved into the first space 112 to the internal body 110, the internal body 110 may include a pair of first coupling holes 115 that are formed in a fore-end portion of the internal body 110 to be symmetrical to each other. The pair of first coupling holes 115 may include screw portions formed on inner circumferential surfaces thereof, respectively and first coupling members B1 may be screwed to the first coupling holes 115, respectively. One pair of first coupling members B1 may include a socket set screw to prevent the first coupling members B1 from protruding out of the internal body 110 when being coupled to the internal body 110. As such, when the internal body 110 is rotated, is moved forward, and is moved backward in the external body 160 as the pair of first coupling members B1 include a socket set screw, the internal body 110 may be smoothly operated without being interfered with an internal portion of the external body 160. The pair of first coupling members B1 may fix the first packing support member 131 to the internal body 110 by inserting the fore ends of the first coupling members B1 into coupling grooves 134 formed in opposite sides of the first packing support member 131 when the pair of first coupling members B1 are coupled to the pair of first coupling holes 115 of the internal body 110. Accordingly, the first packing support member 131 may be rotated and, simultaneously, may be moved forward and backward in the external body 160 along with the internal body 110.

To fix the second sealing unit 140 moved into the second space 116 to the internal body 110, the internal body 110 may include a pair of second coupling holes 117 that are formed at a rear-end portion of the internal body 110 to be symmetrical to each other. The pair of second coupling holes 117 may include screw portions formed on inner circumferential surfaces thereof, respectively and second coupling members B2 may be screwed to the second coupling holes 117, respectively. Like the aforementioned second coupling members B2, the pair of second coupling members B2 may include a socket set screw. The pair of second coupling members B2 may fix the second sealing unit 140 to the internal body 110 by inserting the fore ends of the second coupling members B2 into coupling grooves 143 formed in opposite sides of the second sealing unit 140 when the pair of second coupling members B2 are coupled to the pair of second coupling holes 117 of the internal body 110. Accordingly, the second sealing unit 140 may be rotated and, simultaneously, may be moved forward and backward in the external body 160 along with the internal body 110.

Figure 8A:
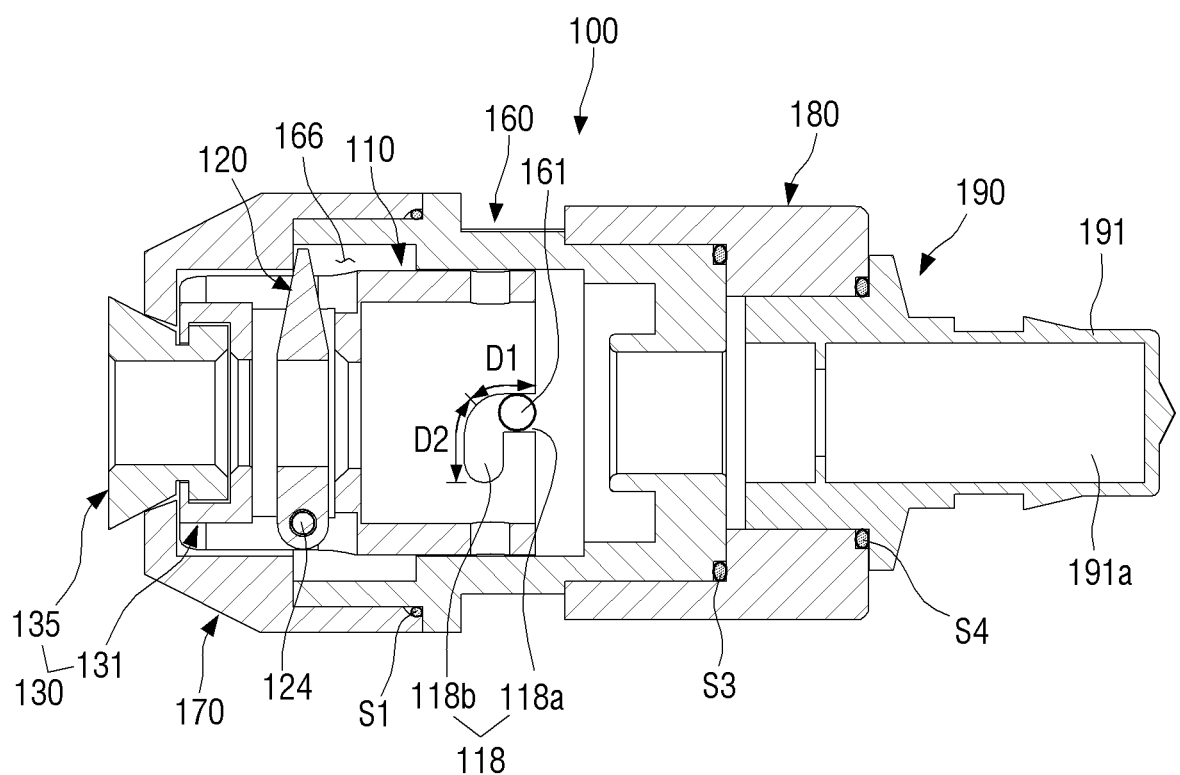
FIGS. 8A to 8C are schematic cross-sectional views sequentially showing positions of a locking protrusion in a locking groove in a procedure of coupling a waterproof quick coupler to a port of a pressure container.
Figure 8B:
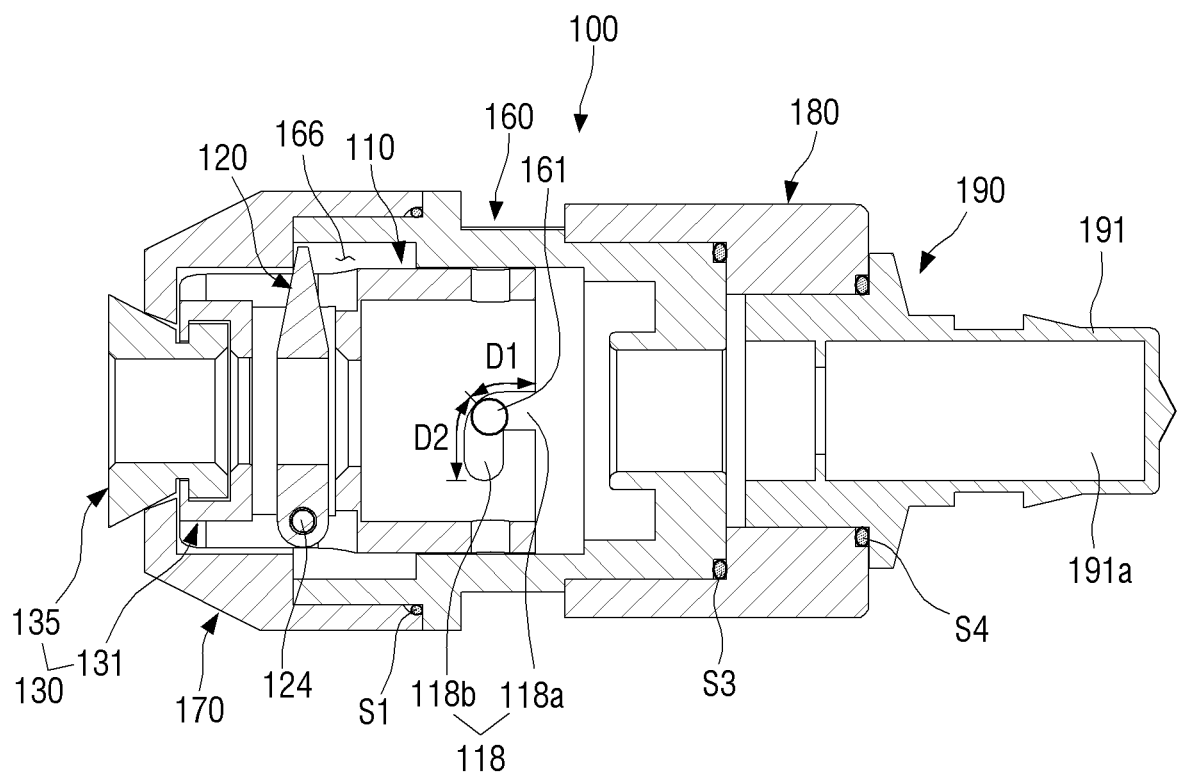
Figure 8C:
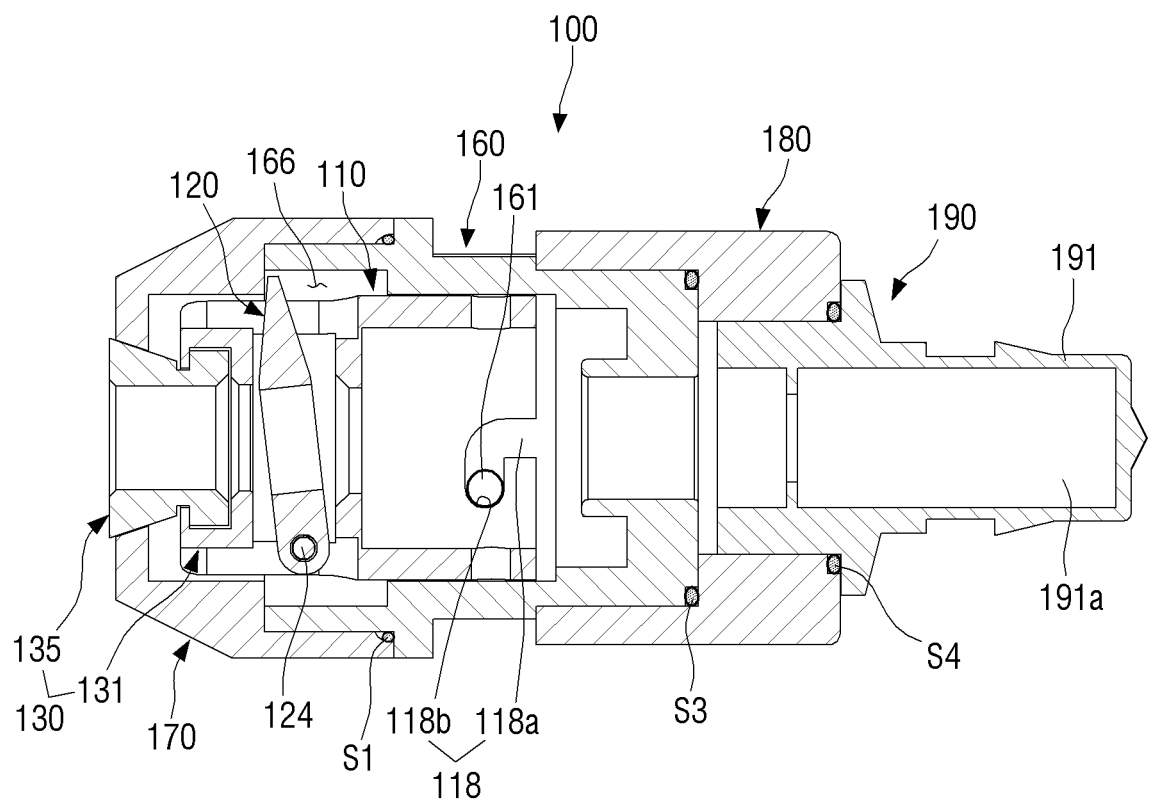

As shown in FIG. 3, in the internal body 110, a pair of locking grooves 118 may be formed at rear-end portions of the internal body 110 to face each other. In this case, the pair of locking grooves may be arranged with corresponding positions rather than being symmetrical to each other. As shown in FIG. 8A-8C, each of the locking grooves 118 may include a first section D1 and a second section D2 that are formed in a longitudinal direction of the internal body 110 from the rear-end portion of the internal body 110.

Accordingly, each of the locking grooves 118 may be bent in the form of an approximate "L" and the second section D2 of the locking grooves 118 may be formed in the same clockwise direction or the same counterclockwise direction. A pair of locking protrusions 161 (refer to FIG. 5) of the external body 160 may be slidably coupled to each of the locking grooves 118. In this case, when the port "P" is moved into the waterproof quick coupler 100 according to the present embodiment, the pair of locking protrusions 161 of the external body 160 may be moved into the second section D2 through the first section D1 when the internal body 110 is rotated and moved backward as the port "P" is moved into the waterproof quick coupler 100 according to the present embodiment. In this case, in a position when the internal body 110 is moved backward, the internal body 110 may be locked by the pair of locking grooves 118 of the internal body 110 and the pair of locking protrusions 161 of the external body 160. In addition, the waterproof quick coupler 100 according to the present embodiment is removed from the port "P", the pair of locking protrusions 161 of the external body 160 may be slidably moved along the second section D2 of the pair of locking grooves 118 of the internal body 110 and may be moved into the first section D1 as being rotated at a predetermined angle, thereby unlocking the internal body 110.

The fixing lever 120 may be perpendicularly positioned to a direction in which the port "P" is moved into the waterproof quick coupler 100 and, when the port "P" is moved into the waterproof quick coupler 100 according to the present embodiment, the fixing lever 120 may be rotated at a predetermined angle to clamp the port "P" and, accordingly, the waterproof quick coupler 100 according to the present embodiment may be fixedly fixed to the port "P".

The fixing lever 120 may include a fix hole 121 that is formed at a center thereof and through which the port "P" is positioned. The fix hole 121 may have a greater diameter than an external diameter of the port "P" and, when the fixing lever 120 is rotated at a predetermined angle, opposite sides of the fixing lever 120 may be simultaneously clamped by an edge of the fix hole 121. Accordingly, the port "P" may be maintained to be moved into the waterproof quick coupler 100 according to the present embodiment by the fixing lever 120.

The fixing lever 120 may include the protrusion 122 that protrudes at one side thereof and the hinge part 123 may protrude at an opposite side of the protrusion 122. The protrusion 122 may be tapered upward from a lower side and may have an approximately triangular sectional view. An upper end portion of the protrusion 122 may be closely adhered to a projection 175 of the cap 170 while being pressed by a first elastic member 126, as shown in FIG. 6. In this case, as shown in FIG. 6, the first elastic member 126 may be arranged between the internal body 110 and the external body 160 in addition, the first elastic member 126 may have one end 126 a that is supported by one lateral surface of the protrusion 122 of the fixing lever 120 and the other end 126 b that is supported by a projection 168 of the external body 160. Accordingly, the upper end portion of the protrusion 122 may always be maintained to be pressed by the projection 175 of the cap 170.

The hinge part 123 of the fixing lever 120 may be coupled to the hinge axis 124 that is a rotation center of the fixing lever 120. As shown in FIG. 4, the hinge axis 124 may be inserted into the through hole 114 of the internal body 110 to allow opposite ends of the hinge axis 124 to be rotated. Accordingly, when the internal body 110 is moved backward, the hinge part 123 may be moved backward along with the internal body 110 and, as the protrusion 122 is continuously and closely adhered to the projection 175 of the cap 170, the fixing lever 120 may be rotated around the hinge axis 124 at a predetermined angle and may be inclined toward the first sealing unit 130. As such, as the fixing lever 120 is inclined, the port "P" moved into the waterproof quick coupler 100 may be clamped by the fixing lever 120, as described above.

As shown in FIGS. 3 and 6, the first sealing unit 130 may include the first packing support member 131 moved into the first space 112 of the internal body 110 and a first packing 135 coupled to the first packing support member 131.

The first packing support member 131 may include a through hole 132 that is formed in a direction in which the first packing 135 is coupled and a coupling space 133 that is formed in the first packing support member 131 and into which a rear-end portion 139 of the first packing 135 is inserted. The first packing support member 131 may include the pair of coupling grooves 134 that are formed in opposite sides thereof and into which the pair of first coupling members B1 are inserted. The pair of coupling grooves 134 may include a screw portion formed on an inner circumferential surface of the coupling grooves 134 to allow the coupling grooves 134 to be screwed to the pair of first coupling members B1. As the first packing support member 131 may be connected to the internal body 110 by the pair of first coupling members B1, the internal body 110 may also be moved while being rotated and moved forward. Accordingly, the first packing 135 coupled to the packing support member 131 may also be removed along with the internal body 110.

The first packing 135 may be formed of rubber or a synthetic resin material with elasticity and, when the port "P" is moved into the waterproof quick coupler 100 according to the present embodiment, the first packing 135 may also be moved backward along with the internal body 110 and may be pressed between the port "P" and the cap 170 to maintain a sealed state between the port "P" and the cap 170. As such, to move the first packing 135 backward along with the internal body 110, the rear-end portion 139 of the first packing 135 may be inserted into the coupling space 133 of the first packing support member 131. In this case, as a projection 131 as of the first packing support member 131 is inserted into a groove 138 formed at a boundary portion between the rear-end portion 139 and portion 137 of the first packing 135, the first packing support member 131 and the first packing 135 may not be separated from each other and may be maintained to be coupled to each other.

As shown in FIG. 6, the first packing 135 may be shaped like a cone in which the fore-end portion 137 is tapered toward a rear end and, thus, an outer circumferential surface of the fore-end portion 137 may configure an inclined surface 137 a. In this case, an inner circumferential surface of a through hole formed through the fore-end portion of the cap 170 may also configure an inclined surface 172 (refer to FIG. 6) corresponding to the inclined surface 137 a of the fore-end portion 137. The first packing 135 may be smoothly moved backward by the inclined surfaces 137 a and 172 and the inclined surface 137 a of the fore-end portion 137 of the first packing 135 may be closely adhered to the inclined surface 172 of the through hole of the cap 170 to maintain a sealed state between the inclined surfaces 137 a and 172 from a position in which the first packing 135 is moved backward and is moved by a predetermined distance. In this case, an inner circumferential surface of a through hole 136 formed forward and backward through the first packing 135 may be elastically and closely adhered to an outer circumferential surface of the port "P" to maintain a sealed state between the first packing 135 and the port "P" for charging refrigerant. When the internal body 110 is moved forward, the first packing 135 may be moved forward along with the internal body 110 to release a pressed state between the port "P" and the cap 170.

The second sealing unit 140 may be closely adhered to an opening Pa (refer to FIG. 6) of the port "P" moved into the waterproof quick coupler 100 according to the present embodiment to maintain a sealed state and may include a cylindrical member 142, a second packing support member 141 inserted into the cylindrical member 142, and a second packing 145 coupled to the second packing support member 141.

The cylindrical member 142 may be positioned in the second space 116 of the internal body 110 and fixed to the cylindrical member 142 by the pair of second coupling members B2. The cylindrical member 142 may include the coupling grooves 143 that are formed at opposite sides thereof and into which the pair of the second coupling members B2 are inserted. In this case, each of the coupling grooves 143 may include a screw portion formed on an inner circumferential surface thereof to allow the coupling grooves 143 to be screwed to the pair of the second coupling members B2. As such, as the cylindrical member 142 is fixed to the internal body 110, the cylindrical member 142 may also be moved along with the internal body 110 while the internal body 110 is rotated, is moved forward, and is moved backward. In this case, a fix groove 147 is a portion for fixing one end 151 of the second elastic member 150 to provide torsion force to the internal body 110 and, thus, the fix groove 147 may be formed at an appropriate position of the rear-end portion the internal body 110 rather than being limited to a position of the cylindrical member 142.

The cylindrical member 142 may include the fix groove 147 that is formed at a rear end thereof and into which the one end 151 of the second elastic member 150 is inserted. At least one fix groove 147 may be formed or a plurality of fix grooves 147 may be formed to variously set torsion force of the second elastic member 150. When the plurality of fix grooves 147 are formed, the fix grooves 147 may be spaced apart at a predetermined angle based on a center of the cylindrical member 142 with respect to one fix groove.

The second packing support member 141 may be coupled to the second packing 145 while being formed through the rear-end portion of the cylindrical member 142 and may include a through hole 141a formed therein in a longitudinal direction of the second packing support member 141. The second packing 145 may be coupled to a fore-end portion of the second packing support member 141 and, in this case, the second packing 145 may not be decoupled from the second packing support member 141 by a projection 141b of the second packing support member 141.

A rear-end portion of the second packing support member 141 may extend by a predetermined length and, thus, the second packing support member 141 may be slidably inserted into a through hole 163 formed in a rear-end portion of the external body 160. In this case, to maintain a sealed state between the second packing support member 141 and the through hole 163, an O-ring S2 may be coupled to a coupling groove 141c formed along an outer circumferential surface of the second packing support member 141. The O-ring S2 may maintain a sealed state of the chamber member 190 along with other O-rings S1, S3, and S4.

The second packing 145 may be formed of rubber or a synthetic resin material with elasticity and the port "P" may be elastically and closely adhered to a front surface of the second packing 145. The second packing 145 may include a through hole 145a formed therein and include a holder 145b corresponding to a projection 141b of the second packing support member 141, which is formed at a rear-end portion of the second packing 145.

The second elastic member 150 may provide both pressurizing force in a forward direction and torsion force in a circumferential direction to the internal body 110 in such a way that the internal body 110 is rotated and, simultaneously, is moved forward and backward. The second elastic member 150 may be configured in the form of a coil spring and the one end 151 and the other end 152 may be bent. Referring to FIG. 6, the one end 151 of the second elastic member 150 may be inserted into the fix groove 147 of the cylindrical member 142 and the other end 152 may be inserted into a fix groove 165 of the external body 160. In this case, the fix groove 147 of the cylindrical member 142 and the fix groove 165 of the external body 160 may be arranged at different angles in such a way that the second elastic member 150 is disposed between the cylindrical member 142 and the external body 160 while being distorted at a predetermined angle to allow the internal body 110 to being rotated during rotation moved backward.

As shown in FIG. 2, the external body 160 may include the internal body 110 that is arranged therein and is moved forward and backward. The external body 160 may include a screw portion 160a formed on an outer circumferential surface of a fore-end portion in such a way that the cap 170 is screwed to the external body 160 and include a screw portion 160b formed on an outer circumferential surface of a fore-end portion in such a way that the connection member 180 is screwed to the external body 160.

Figure 5:
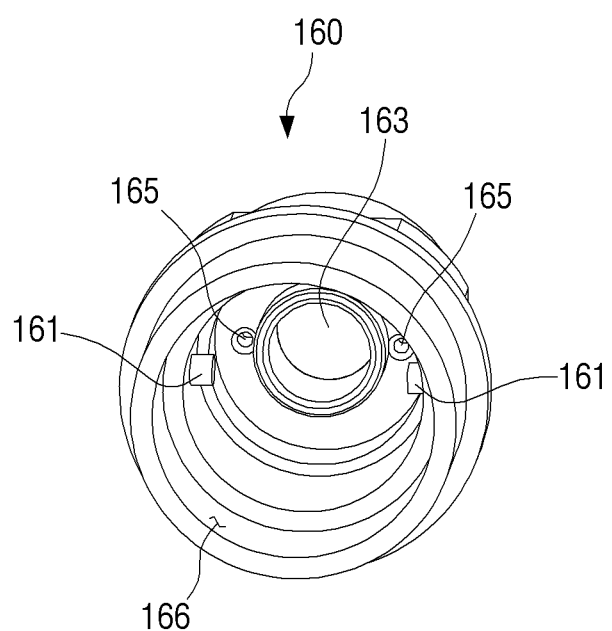
FIG. 5 is a perspective view of an external body shown in FIG. 2.

As shown in FIGS. 3 and 5, the external body 160 may include the pair of locking protrusions 161 that are arranged on an inner circumferential surface of the external body 160 to face each other. The pair of locking protrusions 161 may be slidably coupled to the pair of locking grooves 118 of the internal body 110, respectively. The external body 160 may include the through hole 163 that is formed in a rear end of the external body 160 and into which the rear-end portion of the second packing support member 141 is slidably inserted. The external body 160 may include the fix groove 165 that is formed in a surrounding portion of the through hole 163 and through which the other end 152 of the second elastic member 150 is inserted. Like the fix groove 147 of the cylindrical member 142, at least one fix groove 165 may be formed or a plurality of fix grooves 165 may be formed to variously set torsion force of the second elastic member 150. When the plurality of fix grooves 165 are formed, the fix grooves 165 may be spaced apart at a predetermined angle based on a center of the through hole 163 with respect to one fix groove. The external body 160 may include a concave groove 166 that is formed on an inner circumferential surface of a fore-end portion of the external body 160 along a circumferential direction. As shown in FIG. 6, the protrusion 122 of the fixing lever 120 may be positioned in the concave groove 166 and, when the protrusion 122 is rotated based on the rotation axis 124 and when the protrusion 122 is rotated, is moved forward, and is moved backward along with the internal body 110, the protrusion 122 may not be interfered.

As shown in FIGS. 2 and 3, the cap 170 may include a screw portion 170a that is formed on an inner circumferential surface of a rear-end portion of the cap 170 to be screwed to the screw portion 160a of the external body 160. The cap 170 may be coupled to the fore-end portion of the external body 160 and may cover the fore-end portion of the internal body 110, the first packing support member 131, and the fixing lever 120.

The cap 170 may include a through hole 171 that is formed in a fore end of the cap 170 and through which the first packing 135 is coupled. The through hole 171 may include an inclined surface 172 formed on an inner circumferential surface thereof. The inclined surface 172 may be closely adhered to the inclined surface 137a of the fore-end portion 137 of the first packing 135. The inclined surface 172 may be shaped like a cone in which the first packing 135 is tapered toward an internal side from an external side of the external body 160 to be smoothly moved backward along with the internal body 110. As shown in FIG. 6, the cap 170 may include the projection 175 formed thereon to support the protrusion 122 of the fixing lever 120. The O-ring 51 may be disposed at a portion in which the cap 170 and the external body 160 are coupled to maintain a sealed state between the cap 170 and the external body 160.

As shown in FIGS. 2 and 3, the connection member 180 may include a screw portion 180a that is formed on an inner circumferential surface of a fore-end portion to be screwed to the screw portion 160b of the external body 160 and include a screw portion 180b that is formed on an inner circumferential surface of a rear-end portion to be screwed to a screw portion 190 a of the chamber member 190. The connection member 180 may be a medium for connecting the chamber member 190 to the external body 160. Referring to FIGS. 8A-8C, the O-ring S3 may be disposed at a portion in which the connection member 180 and the external body 160 are coupled and the O-ring S4 may be disposed at a portion in which the connection member 180 and the chamber member 190 are coupled. Accordingly, a sealed state between the connection member 180 and the external body 160 and a sealed state between the connection member 180 and the chamber member 190 may be maintained.

The chamber member 190 may be indirectly connected to the external body 160 through the connection member 180. As shown in FIGS. 8A-8C, the chamber member 190 may include a chamber 191 that is formed therein to accommodate a high pressure (e.g., 15 kg/cm$^2$ or greater) in a compressor connected to the port "P".

Hereinafter, a procedure of coupling and decoupling the above waterproof quick coupler 100 according to the present embodiment to and from the port "P" of a pressure container will be described with reference to FIGS. 6 to 8C.

FIGS. 6 and 8A are diagrams showing a state before the waterproof quick coupler 100 according to the present embodiment is coupled to the port "P" of a pressure container.

As shown in FIG. 6, the internal body 110 may be pressurized in a forward direction by a second elastic member 160. In this case, a fix protrusion 122 of the fixing lever 120 may be supported to be pressed to the projection 175 formed in the cap 170 by the first elastic member 126.

Accordingly, the fixing lever 120 may be vertically arranged as the hinge axis 124 and the protrusion 122 are arranged in approximately the same vertical line. As the fixing lever 120 is perpendicularly arranged, the port "P" moved into the waterproof quick coupler 100 according to the present embodiment may be inserted through the fix hole 121 of the fixing lever 120.

As shown in FIG. 8A, a locking protrusion 161 may be set to an initial position 118a present in the first section D1 of the locking groove 118. In this case, the internal body 110 may be pressurized in a direction in which the internal body 110 is rotated toward the second section D2 from the first section D1 due to torsion force by the second elastic member 150.

Figure 7:
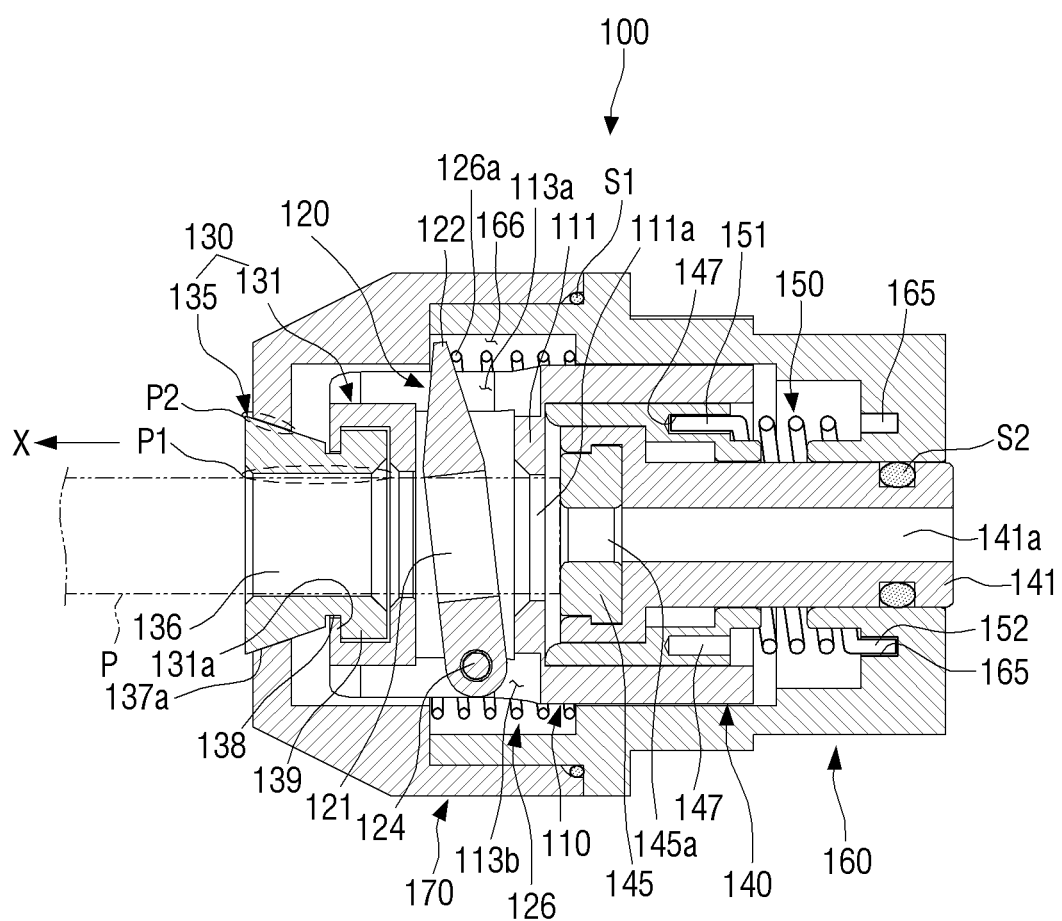
FIG. 7 is a cross-sectional view showing a state in which a waterproof quick coupler is coupled to a port of a pressure container according to an exemplary embodiment.

In this state, a state in which the waterproof quick coupler 100 according to the present embodiment is moved toward the port "P" of a pressure container and is coupled to the port "P" will be described with reference to FIGS. 7, 8B, and 8C. FIGS. 7 and 8C are diagrams showing a state in which the waterproof quick coupler 100 according to the present embodiment is completely coupled to the port "P" of a pressure container. FIG. 8B is a diagram showing a position of a locking protrusion of immediately prior to coupling.

The waterproof quick coupler 100 according to the present embodiment may be moved toward the port "P" (the X direction shown in FIG. 7) of a pressure container and the port "P" may be moved into the waterproof quick coupler 100 according to the present embodiment. The port "P" may sequentially pass the first sealing unit 130, the fixing lever 120, and the intermediate wall 111 of the internal body 110 to contact a front surface 145c of the second packing 145 of the second sealing unit 140.

In this state, when the waterproof quick coupler 100 according to the present embodiment is continuously moved in the X direction, the second sealing unit 140 may be pressed in an opposite direction to the X direction by the port "P". Accordingly, the internal body 110 may be moved backward and, as shown in FIG. 8B, the locking protrusion 161 may be positioned at a boundary between the first and second sections D1 and D2 of a locking groove 118 at the initial position 118a. In this case, the internal body 110 may be rotated by torsion force of the second elastic member 150 and, as shown in FIG. 8C, the locking protrusion 161 may be moved to a locking position 118b along a second section of the locking groove 118.

In this case, as shown in FIG. 7, the hinge axis 124 may be moved backward along with the internal body 110 and the protrusion 122 may be maintained to be continuously and closely adhered to the projection 175 of the cap 170 by the first elastic member 126 and, accordingly, the fixing lever 120 may be maintained to be inclined. As such, as the fixing lever 120 is inclined, the port "P" may be clamped by an edge of the fix hole 121. Accordingly, the port "P" may be fixedly fixed by the fixing lever 120.

As the internal body 110 is moved backward, the first packing 135 may also be moved backward and the inclined surface 137a of the fore-end portion 137 of the first packing 135 may be elastically and closely adhered to the inclined surface 172 of the through hole of the cap 170 to maintain a sealed state between the inclined surfaces 137a and 172. The first packing 135 may be closely adhered to be pressed to an outer circumferential surface of the port "P".

In this case, as shown in FIG. 7, a central line C1 of the through hole 132 of the first packing support member 131 may be deviated from a central line C2 of the through hole 111a of the intermediate wall 111. That is, the through hole 111a of the intermediate wall 111 may be deviated in a downward direction (toward a fix pin 124) compared with the through hole 132 of the first packing support member 131 by a predetermined distance. Accordingly, when the fixing lever 120 is rotated to fix the port "P", the fore-end portion of the port "P" is closely adhered to an upper portion of the through hole 111a of the intermediate wall 111 and, thus, a horizontal state between the port "P" and the waterproof quick coupler 100 may be prevented from being distorted, thereby preventing a space P1 between the port "P" and the through hole 136 of the first packing 135 and a space P2 between the inclined surface 137a of the first packing 135 and an inclined surface 171 of the cap 170 from being increased. Accordingly, a sealed state of the two spaces P1 and P2 may be maintained.

As such, in a state in which the waterproof quick coupler 100 according to the present embodiment is coupled to the port "P", the first packing 135, the second packing 145, and the plurality of O-rings S1, S2, S3, and S4 may maintain a sealed state in the waterproof quick coupler 100. Accordingly, a state of a high pressure (e.g., 15 kg/cm$^2$ or greater) in a compressor may be maintained in a state in which the waterproof quick coupler 100 according to the present embodiment is coupled to the port "P" and, in this state, water pressure test and electro deposition procedures may be performed without removing the waterproof quick coupler 100 from the port "P".

When the electro deposition procedure is completed, a user pulls the external body 160 of the waterproof quick coupler 100 according to the present embodiment in a backward direction of the X direction (refer to FIG. 7) as the external body 160 is rotated while being clamped and, accordingly, the waterproof quick coupler 100 may be easily removed from the port "P". In this case, due to a structure of the quick coupler according to the present embodiment, when the user grasps the external body 160, the cap 170 and the connection member 180 may be grasped together.

As such, when the external body 160 is rotated, the locking protrusion 161 may be moved to a boundary between the first and second sections D1 and D2 shown in FIG. 8B from a locking position 118b of the locking groove 118 shown in FIG. 8C to unlock the internal body 110. Accordingly, the internal body 110 may be pressurized in a forward direction by the second elastic member 150 and, thus, the locking protrusion 161 may be moved to the initial position 118a of the locking groove 118, as shown in FIG. 8A.

As such, as the internal body 110 is moved forward, the hinge axis 124 is also moved forward along with the internal body 110 and, accordingly, the fixing lever 120 may be arranged approximately vertically. Accordingly, the port "P" may be moveable out of the waterproof quick coupler 100 according to the present embodiment while fixing force of the fixing lever 120 is released. In addition, close adherence from the first packing 135 applied to an outer circumferential surface of the port "P" may also be released.

Accordingly, the waterproof quick coupler 100 according to the present embodiment may be easily removed from the port "P" without a separate instrument in a state in which a high pressure (15 kg/cm$^2$) is maintained in a compressor.

In the above case, the waterproof quick coupler 100 according to the present embodiment may include the chamber member 190 to maintain a predetermined pressure in the compressor but, when the port "P" is sealed in an atmospheric pressure, the connection member 180 for connecting the chamber member 190 and the chamber member 190 to the external body 160 may be omitted, needless to say.

Accordingly, in the case of water leak examination on a weld zone of a pressure container, the waterproof quick coupler 100 according to an exemplary embodiment is coupled to a port of a pressure container in a sealed state and, continuously, an electro deposition procedure may be sequentially performed without separation of the waterproof quick coupler 100 from the port "P" after water tank examination.

Figure 9:
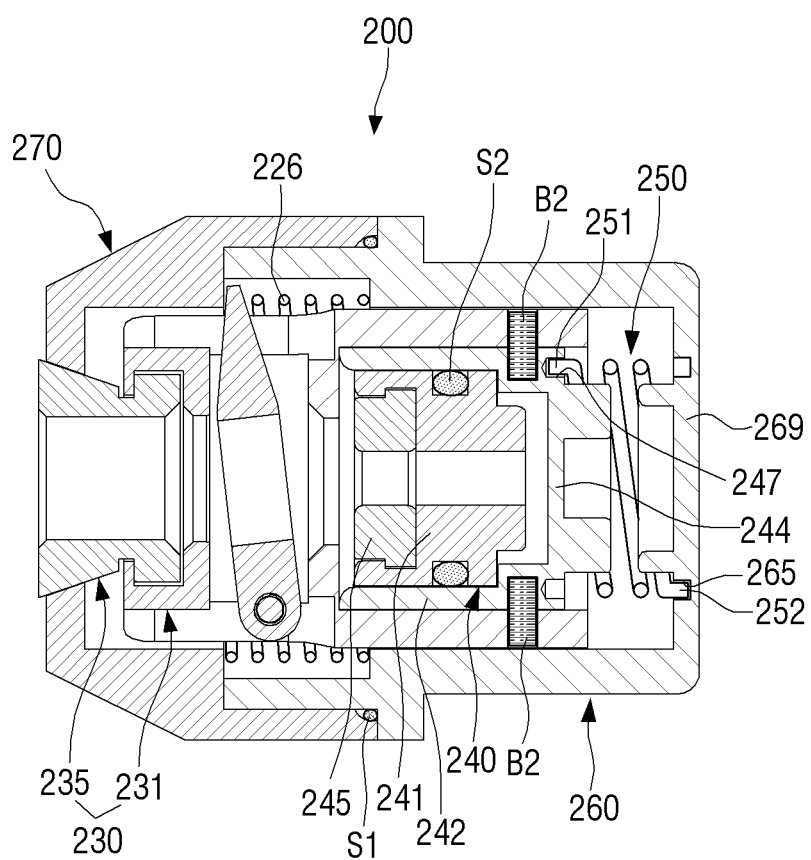
FIG. 9 is a perspective view showing a waterproof quick coupler according to another exemplary embodiment.

FIG. 9 is a diagram showing a waterproof quick coupler 200 according to another exemplary embodiment from which the chamber member 190 and the connection member 180 are omitted.

The waterproof quick coupler 200 according to another exemplary embodiment includes almost the same components as the aforementioned waterproof quick coupler 200 but the chamber member 190 and the connection member 180 are omitted and, thus, an external body 260 is different from the external body 160 of the aforementioned waterproof quick coupler 100. Accordingly, hereinafter, with regard to a description of a configuration of the waterproof quick coupler 200 according to another exemplary embodiment, a description of the same components as the aforementioned waterproof quick coupler 100 is omitted and only the external body 260 as a different component is described.

As shown in FIG. 9, the external body 260 may be sealed by a rear wall 269 formed on a rear-end portion thereof. A fix groove 265 to which the other end 252 of a second elastic member 250 is fixed may be formed on the rear wall. The plurality of fix grooves 265 may be formed.

Differently from the aforementioned the waterproof quick coupler 100, the chamber member 190 and the connection member 180 are omitted and, thus, it may be sufficient that the waterproof quick coupler 200 according to another exemplary embodiment may be configured in such a way that the O-ring includes the O-ring S1 disposed between the external body 260 and a cap 270 and the O-ring S2 disposed between a second packing support member 241 and a cylindrical member 242.

With regard to the waterproof quick coupler 200 according to another exemplary embodiment, the coupling and decoupling procedures of the port "P" are the same as the aforementioned waterproof quick coupler 100.

In FIG. 9, a non-described reference numeral 226 is a first elastic member, 230 is a first sealing unit, 231 is a first packing support member, 235 is a first packing, 240 is a second sealing unit, 245 is a second packing, 247 is a fix groove, 251 is one end of the second elastic member 250, and B2 is a coupling member.

The foregoing exemplary embodiments and advantages are merely exemplary and are not to be construed as limiting the present disclosure. The present teaching can be readily applied to other types of apparatuses. Also, the description of the exemplary embodiments is intended to be illustrative, and not to limit the scope of the claims, and many alternatives, modifications, and variations will be apparent to those skilled in the art.

The present disclosure relates to a waterproof quick coupler for allowing a port of a pressure container to be in a sealed state during water leak examination on a weld zone of a pressure container of a compressor.

What is claimed is:

1. A quick coupler comprising:
   an external body having an opening at a fore-end portion;
   an internal body elastically disposed to be rotated tojb moved in a straight line in the external body;
   a cap coupled to a fore-end portion of the external body; and
   a fixing lever elastically disposed between the internal body and the cap and configured to clamp a port of a pressure container and to unclamp the port while the internal body is moved forward and backward,
   wherein the internal body is locked to the external body while being moved backward and is unlocked from the external body while the external body is rotated in one direction.

2. The quick coupler of claim 1, wherein the internal body is rotated by torsion force while being removed backward by the port and the external body is moved forward by pressurization force while being rotated in a same direction as a rotation direction of the internal body.

3. The quick coupler of claim 2, wherein;
   the external body includes at least one locking protrusion formed in the external body,
   the internal body includes a locking groove to which the locking protrusion is slidably coupled, and
   the locking groove includes a first section formed along a longitudinal direction of the internal body and a second section in a circumferential direction of the internal body from the first section.

4. The quick coupler of claim 3, wherein;
   the internal body is locked to the external body while the locking protrusion is positioned in the second section of the locking groove; and
   the internal body is unlocked from the external body while the locking protrusion is positioned in the first section of the locking groove.

5. The quick coupler of claim 1, wherein the fixing lever;
   clamps the port while being moved backward and being rotated along with the internal body, and
   unclamps the port while the fixing lever is moved forward along with the external body.

6. The quick coupler of claim 1, wherein;
the fixing lever has one end portion that is rotatably coupled to the internal body and another end portion that is elastically supported in the cap, and
the one end portion of the fixing lever is moved along with the internal body and Another end portion of the fixing lever is rotated based on the one end portion of the fixing lever.

7. The quick coupler of claim 6, wherein;
the fixing lever includes a fixing hole into which the port is inserted, and
the port is clamped and is unclamped to and from the fixing hole via rotation of the fixing lever in one direction and an opposite direction thereto.

8. The quick coupler of claim 1, further comprising a first sealing unit coupled through a fore-end portion of the cap and configured to be elastically and close adhered to the port when the internal body is moved backward.

9. The quick coupler of claim 8, wherein:
the first sealing unit includes a first packing inserted into a through hole of the cap,
the first sealing unit includes a first packing support member coupled to the first packing and fixed to the internal body, and
the first packing is pressed and coupled to the through hole of the cap while the internal body is moved backward.

10. The quick coupler of claim 9, wherein an internal diameter of the through hole of the cap is tapered inward from an outer side and the first packing has a shape corresponding to the through hole of the cap.

11. The quick coupler of claim 9 wherein the first packing has a cone shape and has a greater thickness than a thickness of the through hole of the cap.

12. The quick coupler of claim 8, further comprising a second sealing unit fixed to the internal body and configured to be elastically adhered to an opening of the port.

13. The quick coupler of claim 12, further comprising an elastic member shaped like a coil disposed between the second sealing unit and the external body,
wherein the elastic member has one end fixed to the second sealing unit or a rear end of the internal body and Another end fixed to the external body.

14. The quick coupler of claim 12, further comprising a sealing member disposed between the second sealing unit and the external body.

15. The quick coupler of claim 1, further comprising a chamber member detachably coupled to the external body through a connection member and having a chamber connected to an internal portion of the external body,
wherein the external body includes a through hole at a rear end.

* * * * *